INVENTOR.
KARL ZINNER.

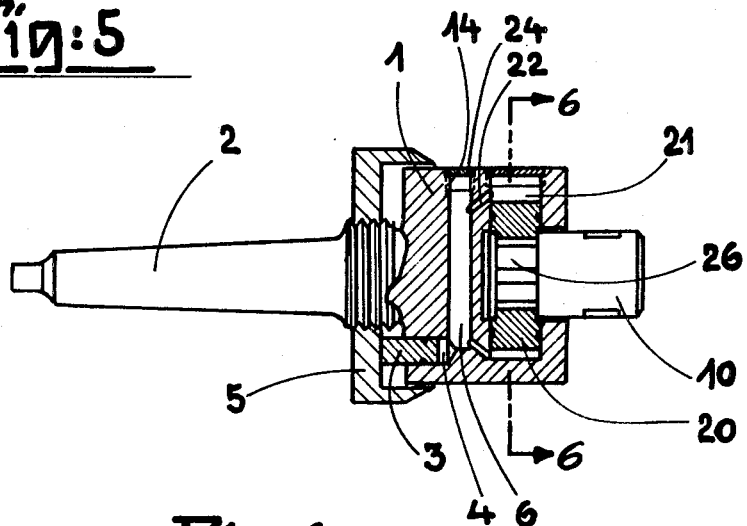
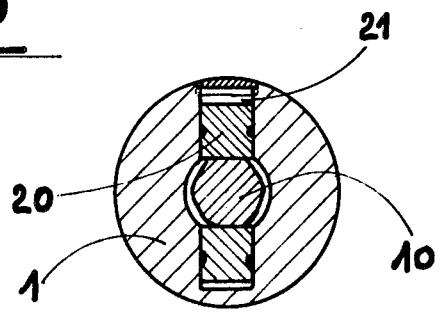
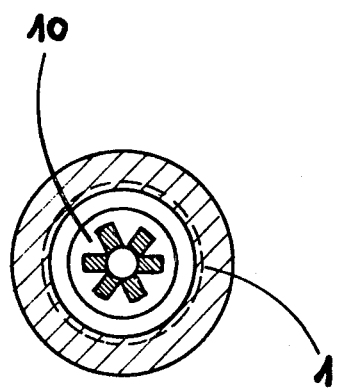

United States Patent Office 3,608,334
Patented Sept. 28, 1971

3,608,334
DEVICE FOR LIMITING TORQUE
Karl Zinner, Nuremberg, Germany, assignor to Richard Glimpel, Lauf an der Pegnitz, Germany
Filed July 8, 1969, Ser. No. 839,901
Claims priority, application Germany, July 9, 1968,
P 17 52 741.2
Int. Cl. F16d 7/00, 43/20
U.S. Cl. 64—29                                11 Claims

ABSTRACT OF THE DISCLOSURE

Thread-cutting devices, machine tools and torque wrenches require a torque limiting device to avoid the danger of overload; this invention relates to a fluid operated clutch mechanism, wherein the fluid has a compressible component such as air in a mixture with a hydraulic fluid. At least one operating piston is moved by the fluid, by movement of a torque limit setting device, either radially or axially to engage a secondary member so that torque is transmitted up to the desired limit at which point the resilience of the fluid permits the piston to disengage from the secondary member so that the clutch slips.

---

The invention relates to a device for limiting the torque transmitted in thread cutting apparatus, machine tools or torque wrenches.

With thread cutting apparatus especially, but also with machine tools in general and torque wrenches, there is the danger that damage will occur as a rseult of torque overloads. To avoid these dangers, mechanical devices can be employed, which consist of a friction clutch and springs for generating the necessary contact force. However, the drawback of these appliances is that they are very expensive, and their range of use is very limited.

An essential concept behind this invention resides in the use of a resilient fluid for operating a clutch device.

According to the invention, there is provided a device for limiting torque transmission between a driving means and a torque receiving means comprising a fluid operated clutch arranged to slip or disengage above a certain torque.

The fluid can have at least a compressible component, and preferably is a mixture of a hydraulic liquid and a gas. The gas can be air.

The clutch may have a main body portion comprising a fluid chamber and a primary member, which is arranged to be moved by fluid pressure in a first direction to engage a secondary member which is connected to the torque receiving means and arranged to be displaced from locking engagement with the secondary member automatically in a second direction when the certain torque is exceeded.

Preferably the primary member is a piston arranged in a bore of the main body portion, the piston having an inner end for receiving the fluid pressure and an outer end for engaging with the secondary member.

The volume of the fluid chamber is preferably adjustable so that the torque transmission limit can be set, preferably by attaching a collar to the main body portion by a screw thread so that rotation of the collar moves a piston into the fluid chamber and the volume of the fluid chamber is thereby reduced.

The primary member may comprise a plurality of pistons in bores arranged generally perpendicular to an end face of the secondary member and uniformly distributed over the periphery of the main body portion, the outer ends of the pistons being curved to engage corresponding recesses in the end face of the secondary member, so that when the certain torque is exceeded the pistons are displaced from locking engagement in the recesses and slide over the end surface of the secondary member.

Alternatively, the primary member may comprise a piston arranged in a central bore generally perpendicular to an end face of the secondary member, the piston having a claw-shaped hook for engaging with a corresponding hook on said end face.

Alternatively, the primary member may comprise two diametrically-opposite pistons arranged in a radial crossbore of the main body portion and the secondary member comprises a shaft of hexagonal cross-section rounded at the corners.

This invention extends to a thread cutting apparatus, a machine tool, or a torque wrench having the invention.

A device according to the invention can have very little wear in the clutch components and be such that when the maximum permissible torque is exceeded an elastic slipping of the clutch is possible. Furthermore, a greater range of use of this safety device can be possible. Clutches according to the invention can be of suitable size so that, for example, they can be used in thread cutting apparatus for cutting threads in the range of M6 to M30. Moreover, the screw thread can be finished in one passage or cutting operation.

The invention will be further described, by way of example, with reference to the accompanying drawings, of which:

FIG. 4 shows a cross-section of the axial hydraulic dog clutch through the lines 4—4 in FIG. 3;

FIG. 5 shows a radial hydraulic clutch in longitudinal section; and

FIG. 6 shows a cross-section of the radial hydraulic clutch through lines 6—6 in FIG. 5.

Figure 1:
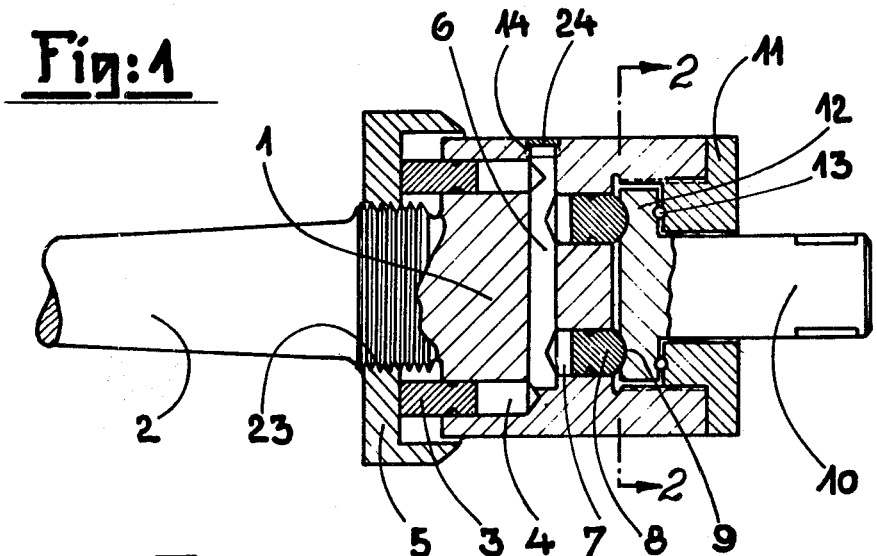
FIG. 1 shows an axial hydraulic clutch in longitudinal section.
Figure 2:
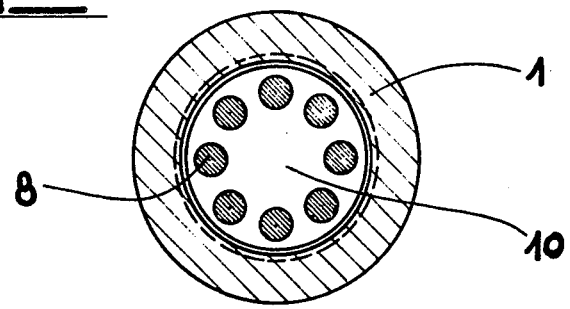
FIG. 2 shows a cross-section of the axial hydraulic clutch through the line 2—2 in FIG. 1.

In a clutch according to FIGS. 1 and 2, a main body portion 1 has at its driving end primary transmission means in the form of a tapered shaft 2. Adjusting piston means in the form of pistons 3, for setting the torque limit, are arranged in axially parallel bores 4 in the main body portion 1 to produce a pressure in the fluid in a cylindrical pressure chamber 6. The pistons 3 are adjusted by rotating a collar 5, which is mounted on the shaft 2 by means of a screw thread 23.

A number of parallel bores 7, which are arranged parallel to the axis of the shaft 2, are uniformly spaced around the periphery of the main body portion 1. In the bores 7 are provided movable members in the form of pistons 8, the outer ends of which are spherically curved, and are arranged to engage in corresponding recesses 9 in the end face of secondary transmission means in the form of a tool receiver 10. To the main body portion 1 is attached a bush 11 by means of a screw thread; the bush 11 has a central bore through which the tool receiver 10 passes. The tool receiver has a transmission member in the form of a shoulder portion 12 which is supported from the bush 11 by ball bearings 13. When no coupling force is present, the tool receiver 10 is rotatably mounted to the main body portion 1.

The main body portion 1 has an opening 14 for introducing fluid into the cylindrical pressure chamber 6. A screw plug 24 closes this opening 14.

Figure 3:
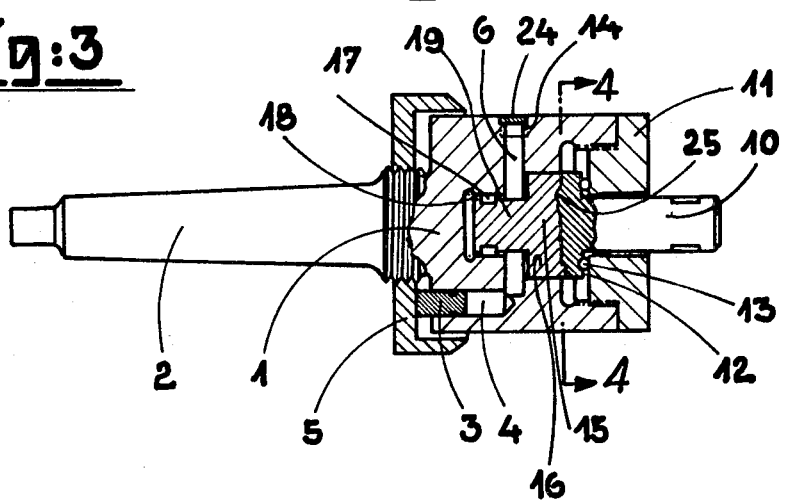
FIG. 3 shows an axial hydraulic dog clutch in longitudinal section.

A second embodiment of the invention is shown in FIGS. 3 and 4, the parts which are identical with the parts shown in FIGS. 1 and 2 being indicated by the same reference numerals. For transmitting torque from the main body portion 1 to the tool receiver 10, there is provided a single movable member in the form of a piston 15 which slides in a central bore 16. Fluid pressure in the pressure chamber 6 forces the outer face of the piston 15 against the end face of a transmission member in the form of an enlarged head of the tool receiver 10, the outer face of the piston 15 and the end face of the tool receiver head being uneven and thereby defining mating protuberances and recesses 25, whereby contact is effected by engagement of the respective protuberances and recesses.

The inner end of the piston 15 has a cylindrical portion 19 which is arranged in a bore 18 of the main body portion 1. The transmission of torque from the main body portion 1 to the piston 15 is effected by means preventing relative rotation in the form of feather keys 17 fitted in key-ways in the cylindrical portion 19. Longitudinal grooves are provided in the bore 18 which allows axial displacement of the piston 15.

A third embodiment of the invention is shown in FIGS. 5 and 6, identical reference numerals indicating parts which are as described above in the other embodiments of the invention. To transmit torque from the main body portion 1 to the tool receiver 10, there are provided two movable members in the form of diametrically opposite pistons 20, which are arranged in a radial cross-bore 21. The cross-bore 21 is connected to the pressure chamber 6 by means of inclined bores 22.

A transmission member in the form of end portion 26 of the tool receiver 10 is provided with a hexagonal cross-section, the corners of the hexagon being rounded off. The outer end face of each piston 20 abuts a flat surface of the hexagon when torque is being transmitted.

The manner of operation of each embodiment is similar. By means of the collar 5, which is mounted on the shaft 2 by means of a fine thread 23, an accurately set pressure is produced in the chamber 6 by moving the pistons 3 in the bores 4. The fluid in the chamber 6 has a compressible component, so that movement of the pistons 3 in the direction of the chamber 6 causes the compressible component to compress as well as causing the piston 8, 15 or 20 to engage the tool receiver 10. Thus, for a desired torque transmission limit, the volume of the pressure chamber 6 is fixed before transmitting torque by suitably setting the collar 5.

As the torque transmission limit is reached, the resilience of the fluid due to the compressible component therein, which is preferably air, allows the pistons 8, 15 or 20 to disengage from the tool receiver 10, and be displaced towards the pressure chamber 6. Therefore, the torque transmitted can be accurately limited to a predetermined value.

For accurate control of the setting of the torque limit, which depends on the starting volume of the pressure chamber 6, a manometer can be connected to the pressure chamber 6, and this can be suitably calibrated.

I claim:

1. A device for limiting torque transmission, comprising:
    primary transmission means,
    secondary transmission means,
    a main body portion connected to one of said transmission means, said main body portion defining a chamber,
    a transmission member connected to the other said transmission means,
    fluid in said chamber, said fluid having at least a compressible component,
    at least one movable member having a part thrust by pressure of said fluid into engagement with said transmission member, whereby said movable member is movable in a direction away from said transmission member when a predetermined torque is exceeded,
    means preventing relative rotation between said movable member and said main body portion, whereby said movable member transmits torque between said main body portion and said transmission member,
    adjusting piston means for adjusting the volume of said chamber for setting said predetermined torque,
    a screw thread on said main body portion, and
    a collar screwed onto said screw thread and abutting said adjusting piston means, whereby rotation of said collar adjusts said volume.

2. A device as claimed in claim 1, wherein said fluid is a mixture of a gas and a hydraulic liquid.

3. A device as claimed in claim 1, wherein said main body portion defines at least one bore and said movable member is at least one piston arranged in said bore, which piston has an inner end for receiving said fluid pressure and an outer end for engaging with said transmission member.

4. A device as claimed in claim 1, wherein said main body portion defines a plurality of bores generally perpendicular to an end face of said transmission member and uniformly distributed around the axis of said main body portion, said movable members are pistons in said bores, the outer ends of said pistons are curved, and said end face of said transmission member defines recesses corresponding to said curved outer ends, whereby when said predetermined torque is exceeded, said pistons are displaced from locking engagement in said recesses and slide over said end face of said transmission member.

5. A device as claimed in claim 2, wherein said main body portion defines a plurality of bores generally perpendicular to an end face of said transmission member and uniformly distributed around the axis of said main body portion, said movable members are pistons provided in said bores, the outer ends of said pistons are curved, and said end face of said transmission member defines recesses corresponding to said curved outer ends, whereby when said predetermined torque is exceeded, said pistons are displaced from locking engagement in said recesses and slide over said end face of said transmission member.

6. A device as claimed in claim 1, wherein said transmission member is secured within the main body portion, and is rotatable therein when said predetermined torque is exceeded.

7. A device as claimed in claim 1, wherein a bush is secured to said main body portion, said transmission member is rotatably mounted by said bush, and ball bearings are provided between said transmission member and said bush.

8. A device as claimed in claim 4, wherein a bush is secured to said main body portion, said transmission member is rotatably mounted by said bush, and ball bearings are provided between said transmission member and said bush.

9. A device as claimed in claim 5, wherein a bush is secured to said main body portion, said transmission member is rotatably mounted by said bush, and ball bearings are provided between said transmission member and said bush.

10. A device as claimed in claim 1, wherein said main body portion defines a central bore generally perpendicular to an end face of said transmission member and said movable member is a piston in said bore, said piston having an end face engaging with said end face of said transmission member, said end faces being non-planar and defining mating protuberances and recesses.

11. A device as claimed in claim 1, wherein said main body portion defines at least one radial cross-bore, said movable members are diametrically-opposed pistons in each said cross-bore, and said transmission member is a shaft of polygonal cross-section rounded at the corners.

References Cited

UNITED STATES PATENTS

| | | | |
|---|---|---|---|
| 1,611,940 | 12/1926 | Ohmer | 64—29 |
| 2,085,620 | 6/1937 | Weihe | 92—133X |
| 2,163,982 | 6/1939 | Mercier | 92—134X |
| 2,408,501 | 10/1946 | Wright | 64—28X |
| 2,501,648 | 3/1950 | Ogden | 64—29 |

FOREIGN PATENTS

| | | | |
|---|---|---|---|
| 956,654 | 1/1957 | Germany | 64—29 |
| 544,230 | 4/1942 | Great Britain | 64—29 |

ALLAN D. HERRMANN, Primary Examiner

U.S. Cl. X.R.

192—56F